United States Patent [19]
Havens

[11] Patent Number: 5,239,827
[45] Date of Patent: Aug. 31, 1993

[54] HYDROSTATIC TRACK RING SNUBBER

[75] Inventor: Dale I. Havens, Addison, Mich.

[73] Assignee: Tecumseh Products Company, Tecumseh, Mich.

[21] Appl. No.: 815,077

[22] Filed: Dec. 27, 1991

[51] Int. Cl.$^5$ .............................................. F16D 39/00
[52] U.S. Cl. ........................................ 60/487; 91/497; 92/12.001; 92/58; 92/72
[58] Field of Search ............... 60/487, 489, 435; 91/497; 417/219; 92/12.1, 58, 72

[56] References Cited

U.S. PATENT DOCUMENTS

| | | | |
|---|---|---|---|
| 4,091,717 | 5/1978 | Bojas et al. | 91/498 |
| 4,564,341 | 1/1986 | Tanaka | 417/219 |
| 4,643,077 | 2/1987 | Bock | 91/497 |
| 4,843,818 | 7/1989 | Thoma et al. | 60/489 |
| 4,920,859 | 5/1990 | Smart et al. | 91/497 |
| 4,968,227 | 11/1990 | Szulczewski et al. | 417/440 |
| 5,000,056 | 3/1991 | Crawford | 74/371 |
| 5,042,252 | 8/1991 | Havens et al. | 60/487 |
| 5,087,227 | 2/1992 | Giere et al. | 60/435 |

Primary Examiner—Edward K. Look
Assistant Examiner—Hoang Nguyen
Attorney, Agent, or Firm—Baker & Daniels

[57] ABSTRACT

A fluid pressure independent, mechanically controlled dampener for a hydrostatic transmission pump track ring is shown. In one embodiment, two opposing wedge-shaped blocks are biased against each other by a spring-loaded bolt. A pad, axially adjacent the track ring on one side and axially adjacent and held together with one block by a Z-bracket on the other side, is biased against the track ring by pressure exerted through the spring-loaded bolt and wedging action of the opposing wedges. In another embodiment, a spring-loaded piston disposed within a spring housing, exerts pressure against a first pad axially adjacent the track ring to hold the track ring against another pad axially adjacent and opposite the first pad.

18 Claims, 2 Drawing Sheets

HYDROSTATIC TRACK RING SNUBBER

BACKGROUND OF THE INVENTION

1. Field of the Invention

The present invention generally relates to hydrostatic transmissions and, more particularly, is concerned with hydrostatic transmission track ring dampeners.

2. Description of the Prior Art

Hydrostatic transmissions transmit rotary mechanical motion, typically from an internal combustion engine, to fluid motion, then back to rotary mechanical motion to rotate a drive axle in order to drive a vehicle such as a lawn and garden tractor or riding mower. The hydrostatic transmission regulates or controls the output rotary mechanical motion such that varying output speeds in the forward and reverse directions are possible with a single speed input rotary mechanical motion. Within a hydrostatic transmission of the radial piston type, a pump and motor each has a cylinder unit that rotates on a fixed pintle with pistons positioned within the cylinders and attached to slippers mounted in an expander band so that as the cylinder unit rotates, the pistons engage a surrounding eccentric annular track ring. The pistons of the pump create a pressurized fluid flow that drives the motor pistons which rotate an output shaft. The transmission ratio is therefore directly proportional to the eccentricity of the track ring of the pump relative to the fixed pintle.

The eccentricity of the pump track ring must therefore be variable and this is accomplished by pivoting the track ring around an axis located at one end of the track ring, the axis generally being a pivot pin. In addition, a control mechanism adapted to swing or pivot the track ring around the pivot axis must also be provided so that an operator can change the eccentricity of the track ring. This type of hydrostatic transmission is shown in U.S. Pat. No. 4,979,583, entitled VARIABLE SPEED TRANSAXLE, issued Dec. 25, 1990, and pending application Ser. No. 07/535,462, entitled VARIABLE SPEED TRANSAXLE, filed Jun. 8, 1990, both of which are specifically incorporated herein by reference.

One of the problems associated with hydrostatic transmissions is the vibration of the pump track ring caused by the rotating pistons/slippers engaging the track ring. The vibration of the track ring creates undesirable noise that is transmitted through the transmission into all of the transmission parts and into the ambient.

One prior art solution to the vibration/noise problem is to position hydraulically actuated pressure pads on opposite lateral sides of the pump track ring to thereby squeeze the track ring between the pads and thus reduce the vibration and associated noise by severely limiting lateral movement of the track ring. The hydraulically actuated pressure pads utilize the hydraulic fluid and pressure within the hydrostatic system for operation.

Although the prior art solution of hydraulically actuated pads effectively reduces the vibration and associated noise, the problem or disadvantage to the prior art solution is that the pressure of the pads is being exerted by means of hydraulic force. The force that is exerted by the pads is directly proportional to the pressure of the hydraulic fluid in the system, while the pressure of the hydraulic fluid in the system is dependent upon the amount of torque that is being exerted on the output shaft. Therefore, the pads exert a force, or squeezing action, against the pump track ring that is dependent upon the torque exerted upon the output shaft. If the torque high, the pads will squeeze against the track ring tightly, if the torque is low, the pads will squeeze against the track ring lightly.

This torque dependency presents a problem in many situations. Hydrostatic transmissions are generally used on riding mowers and tractors that employ manual, clutch transmissions. If the clutch is quickly released with the control lever moved into the forward or reverse position, the high instantaneous torque exerted on the output shaft will cause momentarily high hydraulic fluid pressure, subsequently causing the prior art hydraulically actuated pads to tightly grip the track ring and resist the ability of the operator to move the control back into the neutral position. If the operator releases the control lever to a neutral position, it will encounter resistance since the high torque will produce a high fluid pressure which will cause the track ring to be gripped too tightly and thus resist any movement at all.

A further disadvantage of the prior art relates to the desirability for the operator to have a "feel" of the control lever to indicate when the mower or machine is operating under high torque conditions so that the amount of applied power may be adjusted accordingly. In a hydraulic transmission not employing a vibration damper, if the operator is encountering an incline while pulling a heavy load, for example, the increased torque exerted on the output shaft will be translated into increased oil pressure, which will provide pressure on the control lever tending to move the track ring and control lever back to the neutral position. The operator can sense this feedback pressure and adjust the speed of the mower or machine accordingly by moving the control lever towards the neutral position, thereby reducing the high torque conditions. In the prior art hydraulically actuated pads, the track ring will be clamped more tightly due to the high torque produced oil pressure condition and thus will resist the movement towards neutral, whereby the "feel" or feedback pressure will be lost or significantly reduced.

SUMMARY OF THE INVENTION

The present invention solves the problems of the prior art by providing a mechanical damper for a hydrostatic transmission pump track ring that is independent of the internal hydrostatic fluid pressure or the torque exerted upon the hydrostatic system.

A hydrostatic transmission comprising, a housing, a conduit disposed within the housing, a pump having a plurality of displaceable pistons radially outwardly disposed on and in communication with the conduit, the pump including a track ring radially outwardly disposed on the pistons including means for pivotally connecting the track ring to the housing so as to be eccentrically pivotable about the conduit a motor in communication with the conduit a fluid system internal to the housing communicating with and between the conduit, pump, and motor, the fluid system manifesting a variable fluid pressure within the housing dependent upon torque introduced into the system, and means for damping the vibration of the track ring the damping means is independent of the fluid pressure produced in the system.

In one form thereof, two pads, fabricated from a brakepad-type material, are oppositely laterally disposed axial to the pump track ring while, in one form thereof, a spring-loaded piston located in a housing laterally adjacent one of the pads exerts a constant force against that pad. The track ring is thus squeezed between the two pads by action of the spring.

In a preferred form thereof, two opposing wedge-shaped blocks are laterally disposed relative one of the pads, the block immediate the pad is connected to the pad by a Z-bracket. A spring-loaded bolt extends through blocks for adjusting the tension exerted by the opposing blocks against the track ring as the blocks opposingly slide and axially expand thereagainst.

It is thus an advantage of the present invention that vibration and associated noise art damped without the mechanism being hydraulically dependent.

It is an another advantage of the present invention that the vibration and noise level of the track ring can be variably mechanically pre-set.

It is further an advantage of the present invention that the track ring can easily be returned to neutral under all types of torque and fluid pressure conditions.

It is still further an advantage of the present invention that an operator can feel the response of the transmission as the transmission is operating.

It is yet another advantage of the present invention that the track ring maintains an override function that will return the track ring to neutral upon exceeding preset levels.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
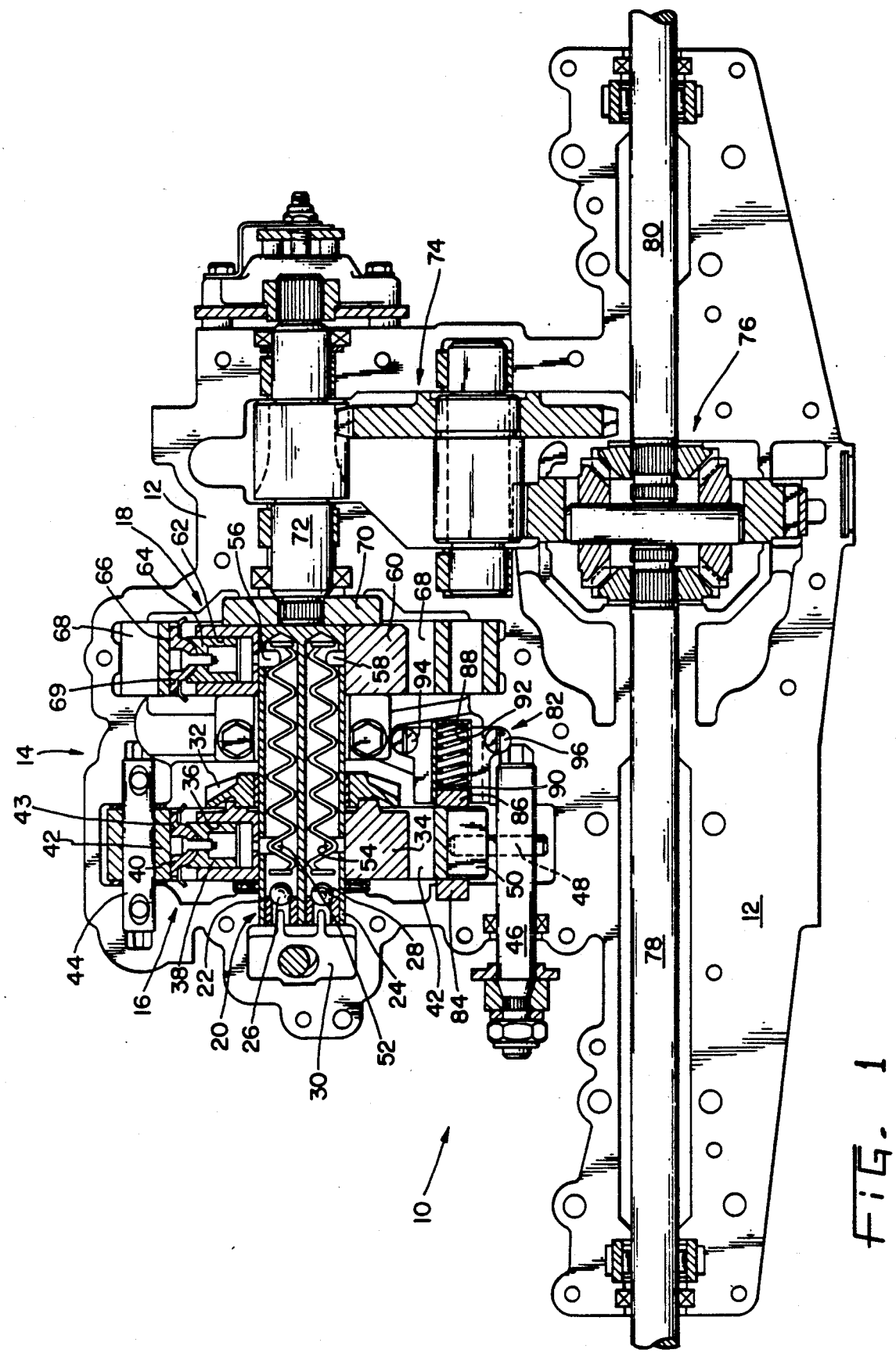
FIG. 1 is a horizontal sectional view showing a variable transaxle showing one embodiment of the track ring damper.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring to FIG. 1, there is shown a transaxle 10 having a lower casing 12 in which is housed a radial piston type hydrostatic transmission (HST) 14. HST 14 includes a pump 16 in fluid communication with a motor 18 via pintle 20. Pintle 20 includes two conduits 22, 24 each having on one end a ball valve 26, 28 engageable by a relief valve 30 for relieving the fluid pressure from within pintle 20. Pump 16 receives rotational input energy, typically from an internal combustion engine (not shown), through direct gearing or belts (not shown) via input bevel gear 32 attached to a rotatable annular pump piston block 34 that is radially disposed about pintle 20. Annular pump piston block 34 has a plurality of radially extending piston bores 36 (only one of which is shown) in which are disposed a corresponding plurality of radially extending pistons 38 (only one of which is shown) attached to a corresponding plurality of slippers 40 (only one of which is shown) radially outwardly of pistons 38. Radially surrounding slippers 40 is a pump track ring 42 having an inner periphery 43 that is contacted by slippers 40, while pump track ring 42 is pivotable about a pivot pin 44 such that pump track ring 42 is eccentrically moveable about pintle 20.

The movement of pump track ring 42 is controlled by the operator through a control mechanism that includes a rotatable control shaft 46 that extends into casing 12 from the exterior thereof to a location radially outwardly of pump track ring 42 diametrically opposite pivot pin 44. The control mechanism also includes a control pin 48 that radially extends through and from control shaft 46 into a pump track ring flange 50 such that as control shaft 46 is rotated, control pin 48 pivots about a center point, defined as the center most axis of control shaft 46, to engage the sides of pump track ring flange 50 to thereby pivot pump track ring 42 about pivot pin 44.

The eccentric position of pump track ring 42 relative to pintle 20 defines forward and reverse movement plus a neutral position. As annular pump piston block 34 is rotated by input bevel gear 32, the pistons and slippers are rotated therewith, the slippers 40 being in continuous moveable contact with the inner periphery 43 of pump track ring 42. The pistons 38 are caused to radially reciprocate within annular pump piston block 34 and, depending on the degree of eccentricity and the direction of eccentricity of pump track ring 42 relative to pintle 20, one of pintle pump ports 52 or 54 is at a high pressure while the other is at a low pressure. This fluid pressure is transmitted through the respective pintle conduits 22, 24 which communicate with respective pintle motor ports 56, 58.

Similar to pump 16, motor 18 includes a rotatable annular motor piston block 60 radially disposed about pintle 20 having a plurality of radially extending piston bores 62 (only on of which is shown) in which are disposed a corresponding plurality of radially extending pistons 64 (only one of which is shown) attached to a corresponding plurality of slippers 66 (only one of which is shown) radially outwardly of pistons 64. Radially surrounding slippers 66 is a motor track ring 68 having an inner periphery 69 that is contacted by slippers 66. Motor track ring 68 is fixedly mounted relative to pintle 20, so the fluid pressure transmitted into pintle motor ports 56 and 58 will cause the pistons to rotate themselves and the annular motor piston block 60 either in a forward or reverse direction depending on which pintle conduit 20, 24 is the high and low pressure conduits.

Axially fixed to annular motor piston block 60 so as to rotate therewith is an output connector 70. Output connector 70 is attached to an output shaft 72 so as to drive the output shaft 72. Output shaft 72 includes gearing 74 that rotatably connects and transfers rotational energy to a differential 76, while differential 76 connects to a left and right axle 78, 80.

Figure 2:
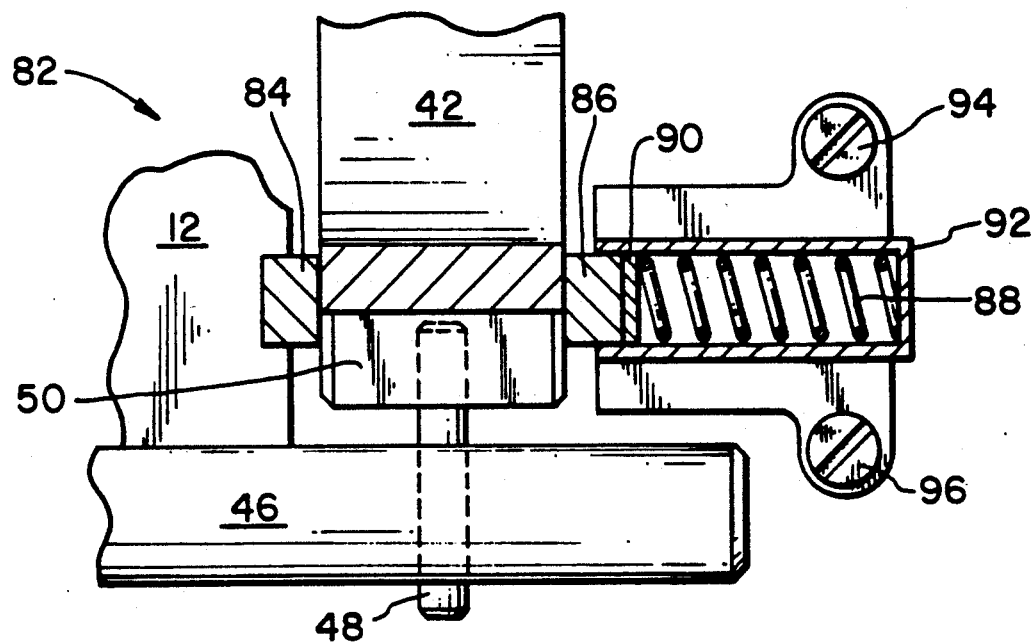
FIG. 2 is an enlarged fragmentary view, of the transaxle showing one embodiment of the track ring damper.

In accordance with the present invention, and referring additionally to FIG. 2, there is shown one embodiment of a mechanical track ring snubber mechanism 82. Track ring snubber 82 includes a pair of pads 84, 86 laterally adjacently disposed of pump track ring 42. Pads 84, 86 are fabricated from any type of conventional brake pad material or similar material to provide good friction contact between the pads and pump track ring 42. As an exemplary design, the brake pad material has a specific gravity of 2.44±0.16, with a co-efficient of friction of 0.30-0.60, equivalent to 1-2 seconds stop time with a dynamometer inertia of 1359 FT/lbs. It is contemplated that different materials exhibiting similar characteristics, as well as the characteristics themselves can be used. Pad 84 is set in a recess in casing 12 so as to be stationary therein, while pad 86 is resiliently biased against pump track ring 42 to engage and squeeze pump track ring 42 between pads 84, 86. Pad 86 is biased by an axially acting spring 88 and backing plate 90 enclosed in a spring housing 92 that is mounted to casing 12 via bolts 94, 96. Spring 88 is of a predetermined tension that biases backing plate 90 against pad 86 to thereby bias pad 86 against pump track ring 42. The tension of spring 88 allows pump track ring 42 to pivot about pivot pin 44 with some resistance when moved by the operator.

Figure 3:
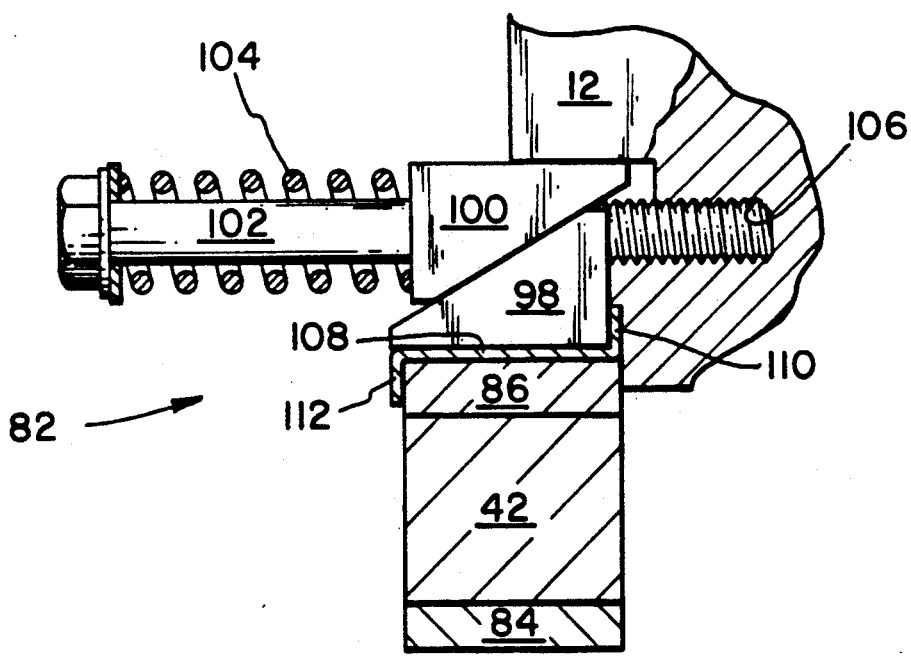
FIG. 3 is an enlarged fragmentary view of the transaxle showing another embodiment of the track ring damper.

Referring now to FIG. 3, there is shown another and preferred embodiment of the present mechanical track ring snubber 82. In this embodiment, two opposing wedge-shaped blocks 98, 100 are utilized in conjunction with a bolt 102 having a spring 104 thereon. Bolt 102 extends from outside casing 12, through wedge 98 and 100 and is threaded into a bore 106 of casing 12. Bolt 102 is oriented 90° from the axis of or perpendicular to spring 88 of FIG. 2. Since bolt 102 extends from casing 12, the snubber mechanism 82 of FIG. 3 is operator adjustable by turning bolt 102, Wherein one direction, "tightening", will provide a tighter squeezing on the track ring while the turning bolt 102 in an opposite direction, "loosening", will provide a lighter squeezing on the track ring. Adjustability is accomplished by action of opposing wedge blocks 98, 100 such that as bolt 102 is tightened, spring 104 axially urges wedge block 100 against wedge block 98 thereby causing radial perpendicular movement, relative to bolt 102, of wedge block 98. This creates a biasing pressure against pad 86 and consequently against pump track ring 42. A loosening of bolt 102 causes wedge block 100 to axially slide away from wedge block 98 to relieve the biasing pressure against pad 86.

In order to prohibit wedge block 98 from just sliding on pad 86 as wedge block 100 exerts pressure thereon and to provide a good contact thereto, wedge block 98 is connected to pad 86 by a Z-bracket 108. Thus, as wedge block 100 slides over wedge block 98, arms 110, 112 of Z-bracket 108 prevents wedge block 98 from sliding with wedge block 100 and translates the axial biasing of wedge block 98 into radial perpendicular biasing of wedge block 98 against pad 86.

In operation, track ring snubber 82 is pre-set, either by the choice of spring as in the embodiment of FIG. 2, or by setting the tension as in the embodiment of FIG. 3, so as to squeeze pump track ring 42 between pads 82, 84. This allows the pump track ring 42 to pivotally move about pivot pin 44 with a set resistance that can be overcome when the operator moves the control shaft 46 changing the eccentricity of pump track ring 42 to effect a speed and/or direction change.

Regardless of the torque, and thus the fluid pressure acting upon and within the hydrostatic transmission, the mechanical track ring snubber 82 of the present invention provides damping of track ring vibration while still allowing the hydrostatic transmission to function normally under all operating conditions. Under high torque loads, the present invention permits the track ring to be moved by the operator to compensate for high or over torque conditions, and allows the track ring to return to neutral upon reaching the same conditions. In addition, the mechanical track ring snubber of the present invention still allows the operator to "feel" the transmission since the track ring is not gripped by a fluid pressure dependent mechanism.

Other mechanisms that exert force independently of the hydraulic pressure of the system may be utilized instead of a spring in the present invention. Such mechanisms would function in the same manner as the function of the spring.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transmission comprising:
   a housing;
   a conduit disposed within said housing;
   a pump having a plurality of displaceable pistons radially outwardly disposed on and in communication with said conduit, said pump including a track ring radially outwardly disposed on said pistons including means for pivotally connecting said track ring to said housing so as to be eccentrically pivotable about said conduit;
   a motor in communication with said conduit;
   a fluid system internal to said housing communicating with and between said conduit, pump and motor, said fluid system manifesting a variable fluid pressure within said housing dependent upon torque introduced into said system; and
   means for damping the vibration of said track ring by exerting a non-intermittent resilient force against said track ring, said resilient force large enough to damp vibrations in said track ring, but no so large as to prevent said eccentric pivotable movement of said track ring, said damping means comprising a pair of pads laterally disposed axially outwardly of said track ring on opposite axial sides thereof, and means for biasing one of said pads against said track ring, whereby said track ring is squeezed between said pads, said damping means operable independent of the fluid pressure produced in said system.

2. The transmission of claim 1, wherein said biasing means comprises:
   a spring for resiliently urging the biased pad, said spring disposed axially outwardly of the biased pad; and
   means for retaining said spring.

3. The transmission of claim 2, wherein said retaining means is a housing radially enclosing said spring.

4. A hydrostatic transmission comprising:
   a housing;
   a conduit disposed within said housing;
   a pump having a plurality of displaceable pistons radially outwardly disposed on and in communication with said conduit, said pump including a track ring radially outwardly disposed on said pistons including means for pivotally connecting said track ring to said housing so as to be eccentrically pivotable about said conduit;
   a motor in communication with said conduit;

a fluid system internal to said housing communicating with and between said conduit, pump and motor, said fluid system manifesting a variable fluid pressure within said housing dependent upon torque introduced into said system; and means for damping the vibration of said track ring by exerting a resilient force against said track ring, wherein said damping means is independent of the fluid pressure produced in said system, said damping means comprising a pair of pads laterally disposed axially outwardly of said track ring and means for biasing one of said pads against said track ring, whereby said track ring is squeezed between said pads, said biasing means comprising a pair of opposing wedge-shaped blocks; and a spring-loaded bolt extending through at least one block and supported by said housing, wherein said spring biases against at least one other block to urge the other block against the biased pad.

5. The transmission of claim 4, wherein said biasing means further comprises a Z-bracket for holding the other block in contact with the biased pad.

6. The transmission of claim 4, wherein said bolt and spring is actuatable to adjust the tension exerted on said track ring.

7. A hydrostatic transmission comprising:
a housing;
a conduit disposed within said housing;
a pump having a plurality of displaceable, radially outwardly disposed pistons in communication with said conduit, said pump including a track ring radially outwardly disposed on said pistons including means for pivotally connecting said track ring to said housing so as to be eccentrically pivotable about said conduit;
a motor in communication with said conduit; and
non-hydrodynamic means for damping the vibration of the track ring by exerting an non-intermittent yielding force against said track ring, said yielding force large enough to damp vibrations in said track ring, but not so large as to prevent said eccentric pivotable movement of said track ring, said damping means disposed axially outwardly of said track ring, said damping means comprising a pair of pads laterally disposed axially outwardly of said track ring on opposite sides thereof, and means for biasing one of said pads against said track ring, whereby said track ring is squeezed between said pads.

8. The transmission of claim 7, wherein said biasing means comprises:
a spring for urging against said biased pad, said spring disposed axially outwardly of the biased pad; and
means for retaining said spring.

9. The transmission of claim 8, wherein said retaining means is a housing radially enclosing said spring.

10. A hydrostatic transmission comprising:
a housing;
a conduit disposed within said housing;
a pump having a plurality of displaceable, radially outwardly disposed pistons in communication with said conduit, said pump including a track ring radially outwardly disposed on said pistons including means for pivotally connecting said track ring to said housing so as to be eccentrically pivotable about said conduit;
a motor in communication with said conduit; and non-hydrodynamic means for damping the vibration of the track ring by exerting a yielding force against said track ring, said damping means disposed axially outwardly of said track ring, said damping means comprising a pair of pads laterally disposed axially outwardly of said track ring; and means for biasing one of said pads against said track ring, whereby said track ring is squeezed between said pads, said biasing means comprising a pair of opposing wedge-shaped blocks; and a spring-loaded bolt extending through at least one block and supported by said housing, wherein said spring biases against at least one other block to urge the other block against the biased pad.

11. The transmission of claim 10, wherein said biasing means further comprises a Z-bracket for holding the other block in contact with the biased pad.

12. The transmission of claim 10, wherein said bolt and spring is actuatable to adjust the tension exerted on said track ring.

13. A hydrostatic transmission comprising:
a housing;
a conduit disposed within said housing;
a pump having a plurality of displaceable pistons radially outwardly disposed on and in communication with said conduit, said pump including a track ring radially outwardly disposed on said pistons including means for pivotally connecting said track ring to said housing so as to be eccentrically pivotable about said conduit;
a motor having a plurality of displaceable pistons radially outwardly disposed on and in communication with said conduit;
a fluid system internal to said housing communicating with and between said conduit, pump and motor, said fluid system manifesting a variable fluid pressure within said housing dependent upon torque introduced into said system; and
means for damping the vibration of said track ring by exerting a non-intermittent resilient force against said track ring, said resilient force large enough to damp vibrations in said track ring, but not so large as to prevent said eccentric pivotable movement of said track ring, wherein said damping means is independent of the fluid pressure produced in said system, said damping means comprising a pair of pads laterally disposed axially outwardly of said track ring on opposite axial sides thereof, and mechanical means for biasing one of said pads against said track ring, whereby said track ring is squeezed between said pads.

14. The transmission of claim 13, wherein said biasing means comprises:
a spring for urging against said biased pad, said spring disposed axially outwardly of the biased pad; and
means for retaining said spring.

15. The transmission of claim 14, wherein said retaining means is a housing radially enclosing said spring.

16. A hydrostatic transmission comprising:
a housing;
a conduit disposed within said housing;
a pump having a plurality of displaceable pistons radially outwardly disposed on and in communication with said conduit, said pump including a track ring radially outwardly disposed on said pistons including means for pivotally connecting said track ring to said housing so as to be eccentrically pivotable about said conduit;

a motor having a plurality of displaceable pistons radially outwardly disposed on and in communication with said conduit;

a fluid system internal to said housing communicating with and between said conduit, pump and motor, said fluid system manifesting a variable fluid pressure within said housing dependent upon torque introduced into said system; and means for damping the vibration of said track ring by exerting a resilient force against said track ring, wherein said damping means is independent of the fluid pressure produced in said system, said damping means including a pair of pads laterally disposed axially outwardly of said track ring, and mechanical means for biasing one of said pads against said track ring, whereby said track ring is squeezed between said pads, said biasing means comprising a pair of opposing wedge-shaped blocks; and a spring-loaded bolt extending through at least one block and seated into said housing, wherein said spring biases against at least one block to urge the other block against the biased pad.

17. The transmission of claim 16, wherein said biasing means further comprises a Z-bracket for holding the other block in contact with the biased pad.

18. The transmission of claim 16, wherein said bolt and spring is actuatable to adjust the tension exerted on said track ring.

* * * * *